US007014114B2

(12) United States Patent
Maiman

(10) Patent No.: US 7,014,114 B2
(45) Date of Patent: Mar. 21, 2006

(54) IMAGE CAPTURE DEVICE FOR AND METHOD OF ELECTRO-OPTICALLY READING INDICIA AT LOW AMBIENT LIGHT LEVELS

(75) Inventor: Mitchell H. Maiman, Holbrook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/679,537

(22) Filed: Oct. 2, 2003

(65) Prior Publication Data

US 2005/0072845 A1 Apr. 7, 2005

(51) Int. Cl.
*G06K 7/10* (2006.01)

(52) U.S. Cl. ............ 235/454; 235/462.01; 235/462.31; 235/462.42; 235/462.43; 235/462.11; 235/462.2

(58) Field of Classification Search ............... 235/454, 235/472.01, 462.31, 462.1, 375, 462.43, 235/462.01, 462.26, 455, 462.45, 462.06, 235/462.42, 462.11, 462.2; 250/208.6, 553, 250/566; 455/556.1, 575.1; 359/663, 821; 382/141

See application file for complete search history.

(56) References Cited

U.S. PATENT DOCUMENTS

| 5,415,264 | A | * | 5/1995 | Menoud | 194/217 |
|---|---|---|---|---|---|
| 5,504,367 | A | * | 4/1996 | Arackellian et al. | 235/462.42 |
| 5,572,006 | A | * | 11/1996 | Wang et al. | 235/454 |
| 5,581,071 | A | * | 12/1996 | Chen et al. | 235/462.06 |
| 5,585,616 | A | * | 12/1996 | Roxby et al. | 235/462.06 |
| 5,598,007 | A | * | 1/1997 | Bunce et al. | 250/566 |
| 5,719,384 | A | * | 2/1998 | Ju et al. | 235/462.1 |
| 5,818,528 | A | * | 10/1998 | Roth et al. | 348/364 |
| 6,098,887 | A | * | 8/2000 | Figarella et al. | 235/472.01 |
| 6,223,988 | B1 | * | 5/2001 | Batterman et al. | 235/472.01 |
| 6,328,211 | B1 | * | 12/2001 | Wilz et al. | 235/462.01 |
| 6,347,163 | B1 | * | 2/2002 | Roustaei | 382/324 |
| 6,431,452 | B1 | * | 8/2002 | Feng | 235/472.01 |
| 6,494,375 | B1 | * | 12/2002 | Ishibashi et al. | 235/462.11 |
| 6,651,893 | B1 | * | 11/2003 | He et al. | 235/494 |
| 6,681,994 | B1 | * | 1/2004 | Koenck | 235/472.01 |
| 6,832,729 | B1 | * | 12/2004 | Perry et al. | 235/472.01 |
| 2002/0000467 | A1 | * | 1/2002 | Dorris et al. | 235/462.01 |
| 2003/0071121 | A1 | * | 4/2003 | Kricorissian | 235/454 |
| 2003/0089775 | A1 | * | 5/2003 | Yeakley et al. | 235/454 |
| 2003/0121976 | A1 | * | 7/2003 | Ostergard | 235/454 |
| 2004/0026509 | A1 | * | 2/2004 | Reichenbach et al. | 235/462.01 |
| 2004/0069855 | A1 | * | 4/2004 | Patel et al. | 235/472.01 |
| 2004/0132491 | A1 | * | 7/2004 | Kim et al. | 455/556.1 |
| 2004/0135912 | A1 | * | 7/2004 | Hofflinger et al. | 348/308 |
| 2004/0175026 | A1 | * | 9/2004 | Tanaka et al. | 382/141 |
| 2004/0206819 | A1 | * | 10/2004 | Okada et al. | 235/454 |

* cited by examiner

*Primary Examiner*—Jared J. Fureman
*Assistant Examiner*—Allyson N Trail
(74) *Attorney, Agent, or Firm*—Kirschstein, et al.

(57) ABSTRACT

External lighting on a data collection terminal provides additional illumination in which to capture an image of an optical code to be electro-optically read by the terminal.

3 Claims, 1 Drawing Sheet

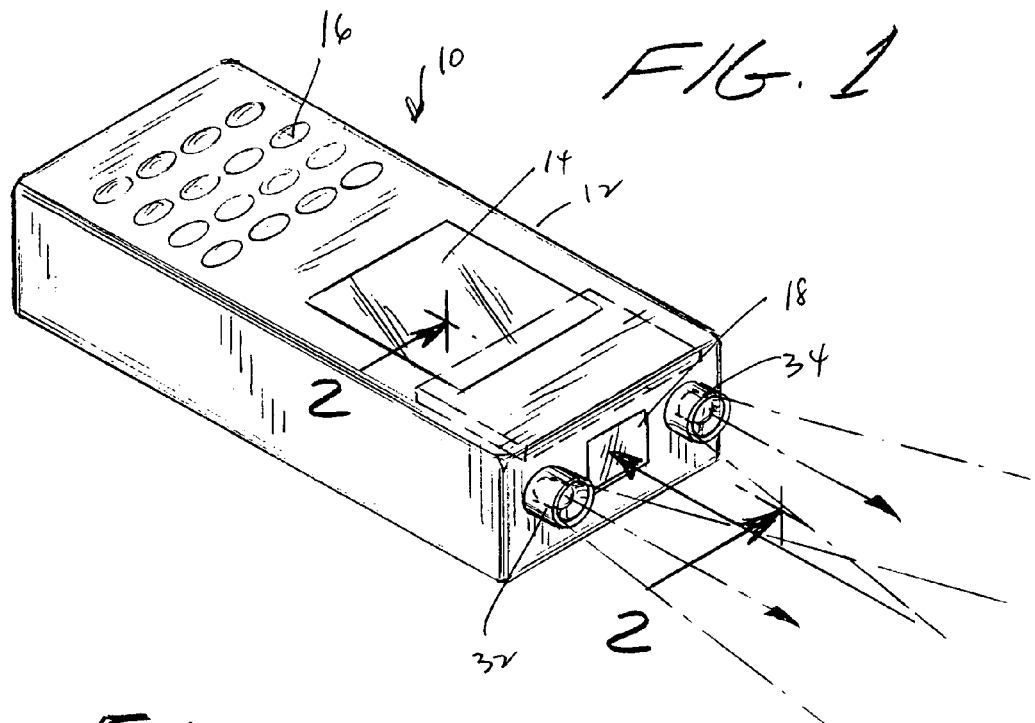
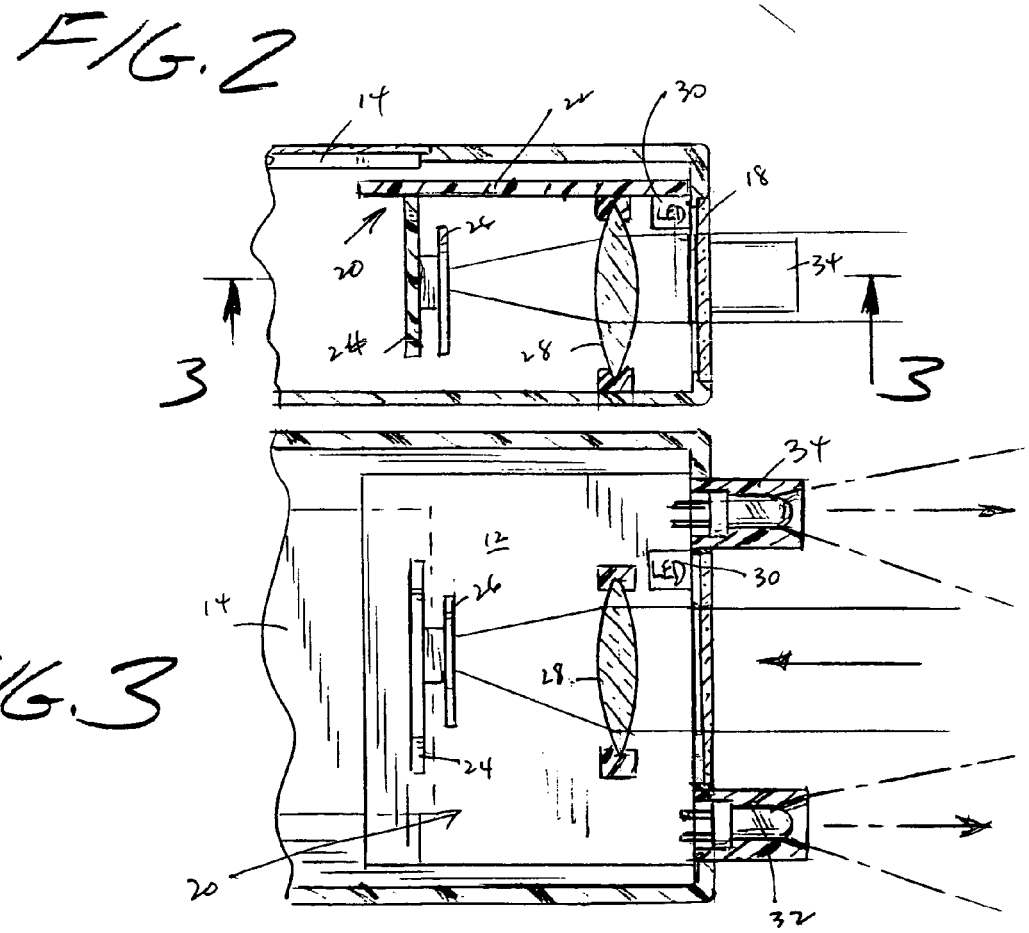

IMAGE CAPTURE DEVICE FOR AND METHOD OF ELECTRO-OPTICALLY READING INDICIA AT LOW AMBIENT LIGHT LEVELS

BACKGROUND OF THE INVENTION

1. Field of the Invention

The present invention generally relates to image capture devices and methods and, more particularly, to capturing an image of an optical code symbol to be electro-optically read using an imaging array, and especially at a low ambient light illumination level.

2. Description of the Related Art

Optical codes are patterns made up of image areas having different light-reflective or light-emissive properties, which are typically assembled in accordance with a priori rules. The term "barcode" is sometimes used to describe certain kinds of optical codes. The optical properties and patterns of optical codes are selected to distinguish them in appearance from the background environments in which they are used. Systems for identifying or extracting data from optical codes are sometimes referred to as "optical code readers" of which barcode scanners are one type. Optical code readers are used in both fixed or portable installations in many diverse environments such as in stores for check-out services, in manufacturing locations for work flow and inventory control, and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. Frequently, the optical code reader includes a hand-held sensor which is manually directed at a target code.

Most conventional optical scanning systems are designed to read one-dimensional barcode symbols. The barcode is a pattern of variable-width rectangular bars separated by fixed or variable width spaces. The bars and spaces have different light-reflecting characteristics. One example of a one-dimensional barcode is the UPC/EAN code used to identify, for example, product inventory. An example of a two-dimensional or stacked barcode is the PDF417 barcode. A description of PDF417 barcode and techniques for decoding it are disclosed in U.S. Pat. No. 5,635,697. Another conventional optical code is known as "MaxiCode". It consists of a central finder pattern or bull's eye center and a grid of hexagons surrounding the central finder. It should be noted that the aspects of the inventions disclosed in this patent application are applicable to optical code readers, in general, without regard to the particular type of optical codes which they are adapted to read. The invention described is also applicable to some associated image recognition or analysis.

Most conventional scanning systems generate one or more beams of laser light which reflects off a barcode symbol and back to the system. The system obtains a continuous analog waveform corresponding to the light reflected by the code along one or more scan lines of the system. The system then decodes the waveform to extract information from the barcode. A system of this general type is disclosed, for example, in U.S. Pat. No. 4,251,798. A beam scanning system for detecting and decoding one-and two-dimensional barcodes is disclosed in U.S. Pat. No. 5,561,283.

Many scanning systems in use today employ a scanning laser beam. Some such systems are deployed in hand-held devices which may be manually pointed at a target. Often an individual system is a component of a much larger network including other scanners, computers, cabling, data terminals, etc.

Barcodes can also be read by employing imaging modules in the systems. For example, an imaging module may be employed in a device which contains a two-dimensional array of cells or photosensors which correspond to image elements or pixels in a field of view of the device. Such an imaging module may include a two-dimensional or area charge coupled device (CCD) or complementary metal oxide semiconductor (CMOS) array, associated circuits for producing electronic signals corresponding to the two-dimensional array of pixel information over the field of view, and a single light emitting diode (LED) for providing background light illumination.

It is therefore known to use a CCD for capturing a monochrome image of a barcode symbol to be read as, for example, disclosed in U.S. Pat. No. 5,703,349. It is also known to use a CCD with multiple buried channels for capturing a full color image of a target as, for example, disclosed in U.S. Pat. No. 4,613,895.

Although generally satisfactory for its intended purpose, the known imaging module tends to have poorer performance as the size of the module decreases. In many applications, especially in mobile, portable data collection terminals, it is desired to have the terminal as light in weight, as energy efficient, and as compact as possible. However, such weight, size, and energy constraints configure the module with a single light emitting diode (LED) for providing background light illumination. This limited illumination, especially in dimly lit ambient environments, tends to degrade image capture performance.

SUMMARY OF THE INVENTION

OBJECTS OF THE INVENTION

Accordingly, it is a general object of this invention to capture an image of an optical code even at low ambient light illumination levels.

Still another object of the present invention is to improve image capture by increasing the light illumination level when needed.

FEATURES OF THE INVENTION

In keeping with the above objects and others which will become apparent hereinafter, one feature of the present invention resides, briefly stated, in an image capture device and method for electro-optically reading indicia, such as bar code symbols. The device includes a housing of any form factor and bounding an interior. A light-transmissive window is mounted on the housing.

An imaging module is located within the interior of the housing and includes an array of sensors spaced apart at respective locations in the array for detecting light incident on the sensors. The light is reflected from the indicia through the window over a field of view. The array is a two-dimensional, solid-state, CCD or CMOS device. In the preferred embodiment, each sensor has three photosensors and is operative for measuring each of three primary colors of the incident light at the same location of the respective sensor to obtain a measured red signal, a measured blue signal and a measured green signal, preferably, as disclosed in U.S. Pat. No. 5,965,875, by detecting differences in absorption length in silicon of different wavelengths of the incident light at each sensor. This full color imaging array which senses every primary color in every sensor is operative for capturing a high resolution, high sensitivity, three-color image of the indicia. A monochrome array could also be employed.

The module also includes an internal light source, especially a single light emitting diode (LED). The LED is energized to provide background illumination.

In accordance with this invention, external lighting is mounted on an exterior of the housing for additionally illuminating the indicia with additional illumination to generate a broad, brightly illuminated area or environment in which the indicia is imaged. In the preferred embodiment, the external lighting is a pair of LEDs mounted on the housing at opposite sides of the window. Hence, the extra illumination is not part of the module, but is incorporated into the housing.

The extra illumination is not desired at all times. A controller detects the ambient illumination and energizes the external lighting when the detected ambient illumination is below a threshold level. This increases energy efficiency.

For reading the optical code, a color or a monochrome array can be employed. In the case of a color array, it is not necessary to distinguish among colors in the image. A plurality of the measured signals, for example, the red and the blue signals, can be mixed and combined to produce a composite monochrome signal which is used to read the optical code. This mixing can be performed by hardware or software outside the array, or within the array, in both the analog or digital domain. The composite signal has a higher resolution and a higher sensitivity as compared to known Bayer color filter array (CFA) patterns used in optical code readers, because the composite signal is generated from at least two measured signals at each sensor, and not from one measured signal at each sensor.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of an image capture device of a preferred embodiment of this invention;

FIG. 2 is a broken-away, sectional view taken on line 2—2 of FIG. 1; and

FIG. 3 is a broken-away, sectional view taken on line 3—3 of FIG. 2.

DETAILED DESCRIPTION OF THE PREFERRED EMBODIMENTS

Referring now to the drawings, FIG. 1 illustrates an image capture device 10 of a preferred embodiment of the present invention. The device 10 includes a housing 12 of any form factor. Housing 12 is advantageously a portable data collection terminal having a display 14, a keyboard 16, and a window 18 through which light passes.

An imaging module 20, as shown in FIGS. 2–3, is mounted inside the housing 12.

Module 20 includes a pair of printed circuit boards 22, 24, an image sensor array 26 having a plurality of spaced-apart sensors lying in a plane, a focusing lens 28, and an internal light source 30, preferably a light emitting diode, mounted on board 22. The sensors convert light reflected from an indicia exteriorly of the housing into electrical signals. A suitable array is disclosed in U.S. Pat. No. 5,965,875, the contents of which are incorporated herein by reference thereto. Other suitable arrays are CCD and CMOS arrays.

In operation, light over the field of view from the indicia passes through the window 18 and into the focusing lens 28 which focuses the light on a surface of the array. Preferably, the array of cells or pixel sensors each has three photosensors to produce electronic signals corresponding to a two-dimensional array of pixel information for a target image. Each pixel sensor is operative for measuring each of three primary colors of the incident light at the same location in the array as the respective sensor to obtain a measured red signal, a measured blue signal and a measured green signal for each sensor.

The internal light source 30 provides an illumination field for the array. Power for the internal source 30 is provided from the module.

The module, when assembled, forms an extremely compact unit, typically measuring 1"×1.5"×0.75" in size and about 1.25 cubic inches in volume. The compact unit can conveniently fit within a device of various form factors, such as the hand-held housing of FIG. 1 in which the cross-sectional dimensions and overall size of the housing are such that the device can conveniently be held in the user's hand. The housing may be constructed of a lightweight resilient shock-resistant self-supporting material such as a synthetic plastic material. The plastic housing may be injection molded but can be vacuum formed or blow-molded to form a thin hollow shell which bounds an interior space whose volume is sufficient to contain the module and other components.

As noted above, the illumination provided by the internal source 30 is limited due to size, weight and energy constraints required for a portable device. This invention proposes the use of external lighting, preferably exemplified by a pair of light emitting diodes 32, 34 flanking the window 18, mounted on an exterior wall of the housing and operative for additionally illuminating the indicia with additional illumination to generate a broad, brightly lit illuminated area or environment in which to read the indicia. The external light sources 32, 34 are energized by an on-board battery via a controller operative for detecting the ambient light level, and for energizing the external light sources only when the detected light level is below a threshold. Thus, in a brightly lit environment, the external sources are not needed or energized. In a dim environment, the external sources provide the extra illumination needed for improved image capture performance. The external light sources are not mounted on or incorporated in the module, but instead, are mounted on the housing and energized and controlled by components other than those in the module.

It will be understood that each of the elements described above, or two or more together, also may find a useful application in other types of constructions differing from the types described above.

While the invention has been illustrated and described as embodied in an image capture device for and method of electro-optically reading indicia at low ambient light levels, it is not intended to be limited to the details shown, since various modifications and structural changes may be made without departing in any way from the spirit of the present invention.

For example, the form factor in which the image capture system is currently preferred to be housed is a hand-held rectangular parallelepiped housing resembling a personal digital assistant, or cellular telephone, or data collection terminal, but could also be a gun-shaped housing, or a pen-shaped wand.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An image capture device for electro-optically reading indicia, comprising:
   a) a housing bounding an interior and having an exterior front wall facing the indicia, and a light-transmissive window mounted on the exterior front wall;
   b) an imaging module located within the interior of the housing and having an array of spaced-apart sensors for detecting incident light reflected from the indicia through the window over a field of view, and an internal light source for providing background illumination; and
   c) a single pair of external light emitting diodes (LEDs) flanking the window and mounted on the exterior front wall of the housing, the LEDs being mounted in sleeves perpendicularly projecting past the window for additionally illuminating the indicia with additional illumination to generate a broad, brightly illuminated area in which the indicia is imaged.

2. The device of claim 1, wherein the housing includes a keyboard and a display and constitutes a data collection terminal.

3. The device of claim 1, and further comprising control means for detecting the ambient illumination, and for energizing the LEDs when the detected ambient illumination is below a threshold level.

* * * * *